A. LAMONTAGNE.
BLOWER FOR VENTILATING SYSTEMS.
APPLICATION FILED MAY 24, 1920.
1,375,595.
Patented Apr. 19, 1921.
2 SHEETS—SHEET 2.
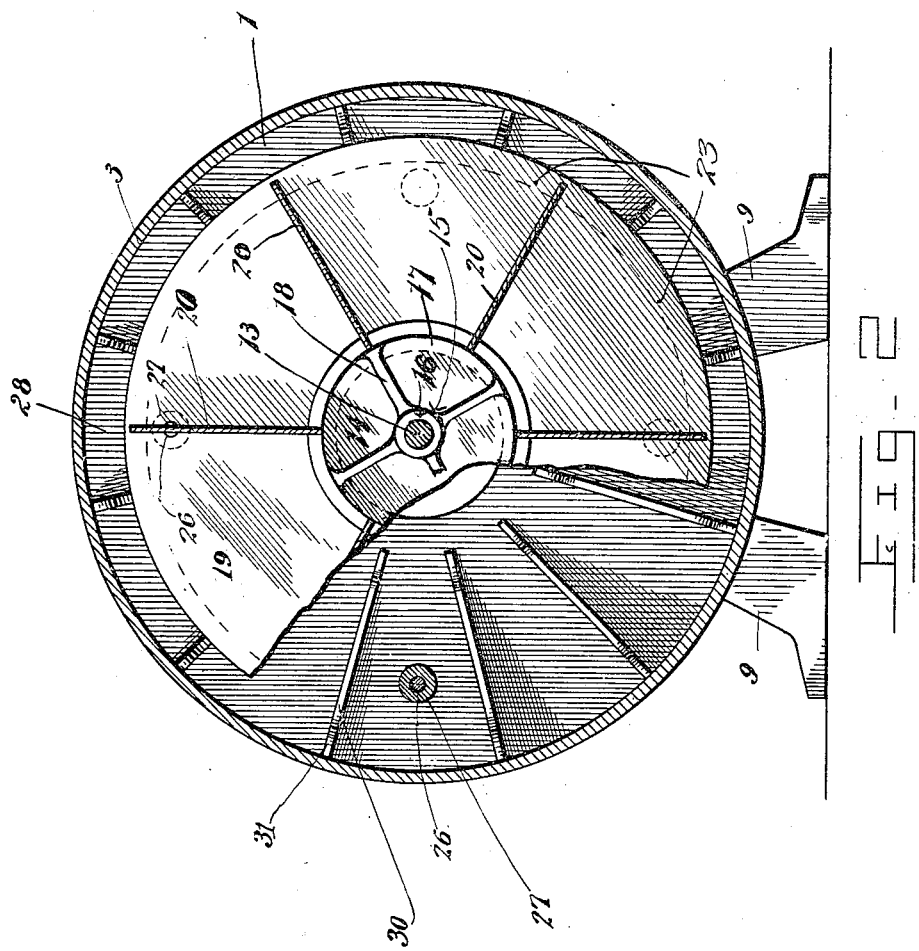
Inventor
Antoine Lamontagne
By William C Sinton
Attorney

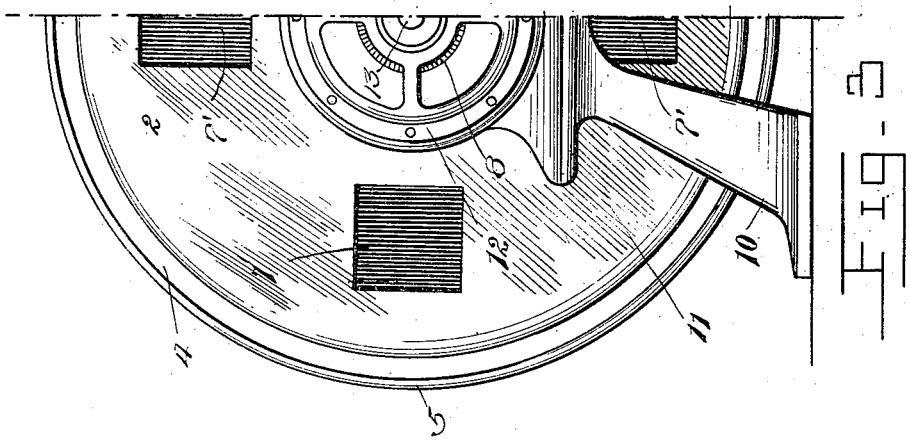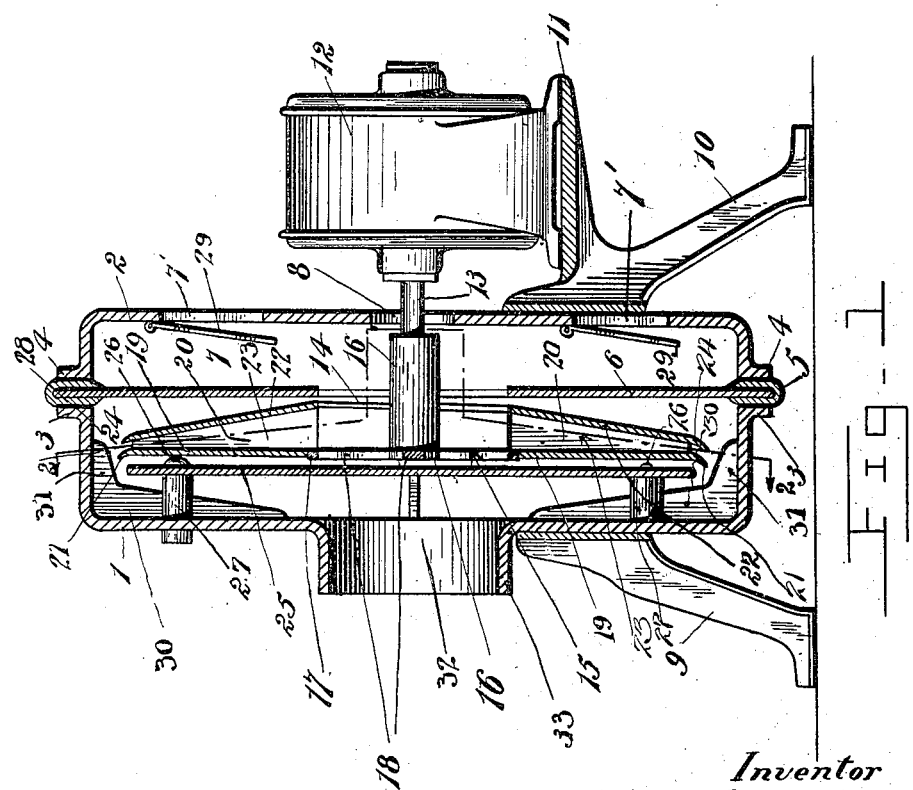

UNITED STATES PATENT OFFICE.

ANTOINE LAMONTAGNE, OF MONTREAL, QUEBEC, CANADA.

BLOWER FOR VENTILATING SYSTEMS.

1,375,595.   Specification of Letters Patent.   Patented Apr. 19, 1921.

Application filed May 24, 1920. Serial No. 383,741.

*To all whom it may concern:*

Be it known that I, ANTOINE LAMONTAGNE, a subject of the King of Great Britain, residing at Montreal, Province of Quebec, Canada, have invented certain new and useful Improvements in Blowers for Ventilating Systems; and I do hereby declare that the following is a full, clear, and exact description of the invention, such as will enable others skilled in the art to which it appertains to make and use the same.

The present invention relates to blowers for ventilating mines and buildings, hot-air heating systems, air-blasts in iron and steel foundries, pipe organs, and wherever the same are required. The principal object of the invention is to obtain a higher efficiency in the operation of air-blowers.

A further object is to eliminate the end thrust encountered in blowers having inclined blades, by the provision of rotating blades having their planes at right angles to their plane of rotation.

Another object of the present invention is to minimize the noise attendant to the operation of air blowers using inclined blades.

A still further object is to obtain greater simplicity of blower construction, and means for adjustment, rendering the same more commercially desirable.

With the above and other objects in view which will hereinafter appear as the description continues, the invention consists of the novel features of construction, combination and formation of parts, as will be hereinafter more fully described and particularly pointed out in the appended claims.

In the accompanying drawings has been shown a simple and preferred form of the invention, it being, however, understood that no limitation is necessarily made to the precise structural details herein exhibited, but the right is hereby reserved to any changes, alterations or modifications to which recourse may be had, that come within the scope of the claims without departing from the spirit of the invention or sacrificing the efficiency of the same.

In the accompanying drawings:—

Figure 1 is a central cross-section of a blower, illustrating the coupling of the operative elements with an electric motor;

Fig. 2 is a vertical section on line 2—2 of Fig. 1, looking in the direction of the arrows; and, Fig. 3 represents a rear elevational view of one half of the blower illustrating a series of inlet ports in the outer casing.

Referring now more particularly to the accompanying drawings wherein like and corresponding parts are designated by similar reference characters throughout the several views:

The improved blower comprises an outer casing formed of two sections 1 and 2. The marginal and confronting edges of said sections 1 and 2 are provided with the outwardly projecting radial flanges 3 and 4. Interposed between the sections 1 and 2 is a ring element 5 which latter is formed with a central channel adapted for the reception of a disk 6, thus forming a chamber 7 at the rear of the blower.

These sections 1 and 2 and consequently disk 6 are held within the ring element 5 by bolts or other suitable securing means.

Casing section 2 is formed with a plurality of spaced radially disposed ports 7′ located contiguous to its outer periphery and a port 8 is provided at its central part.

The casing sections are supported upon the standards 9 and 10, the former being bolted to section 1, while the latter is bolted to the section 2.

Standard 10 is formed with a platform 11 on which is mounted an electric motor 12, the shaft 13 of which extends through the section central opening 8 and the central opening 14 of the disk 6. The motor shaft 13 has keyed thereon a spider 15 comprising a hub 16 and a circular rim 17 which latter is secured to the hub 16 by spokes 18.

Secured to the rim 17 is a ring plate 19 which carries a plurality of blades 20 of trapezoidal configuration and said blades 20 extend radially in planes at right angles to their plane of rotation with respect to shaft 13.

The width of said blades 20 diminishes from their point of connection with the ring plate 19 to their outer extremities, at which point plate 19 has its outer peripheral edges bent outwardly as at 21.

A plate 22 is secured to the outer edge surfaces of the blade 20 and like ring plate 19 is provided with a central opening which extends in horizontal alinement with opening 14 of plate 6.

These plates 19 and 22 are spaced apart by the blades 20 and thereby longitudinal chambers 23 are formed and such chambers at their lower ends communicate with the open central portion of the rim 17, and as the shaft revolves, air is sucked through the rear section openings 7' and 8 and through plate opening 14 into the blower chambers 23. The air thus gathered in this manner is centrifugally forced through the chambers 23 and impinges or impacts against the radial wall of section 1.

The outer extremity of plate 22 is curved outwardly at 24 and spaced from the outwardly curved edge of plate 21. The depth of chambers 23 diminishes from the neutral open port of the blower to the outer periphery of plates 19 and 22 and by means of the outwardly turned plate portions the air is directed at an angle to the radial wall of the blower section 1.

Another plate 25 is secured to the inner surface of section 1 by bolts 26 which pass through the tubular bushings 27, nuts being provided, which, when adjusted on said bolts, cause plate 25 to be adjusted transversely of plate 19.

In this manner the blades 20 operate in a chamber formed by the disk 6 and plate 25, and as the outer edge of said plate 25 and ring plates 19 and 22 are spaced from the walls of casing section 1, an annular passage 28 is formed.

The openings or ports 7' of the inner section 2 are normally closed by the flap valves 29, secured at their upper ends to the inner surface or wall of section 2, contiguous to the said ports.

A plurality of radially disposed ribs 30 are secured to the inner surface of the vertical wall of section 1 and said ribs have their outer ends 31 directed at right angles to the vertical continuity thereof, and said outer ends are appropriately secured to the horizontal wall of the said section. The said ribs 30 are of double wedge configuration having their greater thickness at their upper part, or that is to say, at the intersection with the angularly disposed upper ends. The lower portions of the ribs diverge inwardly toward the center of the said casing and serve to direct the air toward that point.

In operation, as the motor 12 drives shaft 13, motion is imparted to the rim 17 carrying blades 20. Air will be sucked into casing chamber 7 through ports 7', thereby unseating the valves 29 controlling said ports. The air is then sucked through the opening 14 of disk 6 into chambers 23 between plates 19 and 22 and the blades 20. The blades 20 then whirl this air centrifugally against the circumferential walls of the section 2 and through the opening or space leading to chamber 28. The air is then forced by ribs 30 to the central part of section 1, being directed inwardly between the section wall and the plate 25 and from thence out of the blower through the central exhaust opening 32. In forming this exhaust opening, the metal at the central part of section 1 is pressed outwardly to form a radial flange 33, to which may be connected a supply pipe leading to the ventilating or heating system, or to the operative mechanism of a pipe organ.

In this manner, air is sucked into the blower wheel chambers 23 between each blade and is centrifugally whirled against the inner wall of the section 1.

By providing restricted openings between the plates 19 and 22, the air is forced through said openings under high pressure and a greater volume of air at high pressure is directed outwardly from the central part of the blower, then inwardly by means of the ribs 30. The air under pressure unites at the central opening 32 and rushes to its proper destination.

Having thus fully described my invention, what I claim as new and desire to secure by Letters Patent is:

1. In apparatus of the class described, a blower casing of generally cylindrical contour formed of sections, a rotatable blower disposed in said casing and having blades mounted thereon, one of said sections formed with air inlet ports, valves controlling said ports, a disk interposed between said casing sections, a plate disposed in front of said blades, said blades having their planes disposed at right angles to the plane of rotation, and means for mounting said blades upon said blower.

2. In apparatus of the class described, a blower casing of generally cylindrical contour formed of sections, a rotatable blower disposed in said casing and having blades mounted thereon, one of said sections formed with air inlet ports, valves controlling said ports, a disk interposed between said casing sections, plates connected to said blades, said blades having their planes disposed at right angles to the plane of rotation, a plate connected to one of said sections, means for mounting said blades upon said blower, and means for adjusting said plate.

3. In apparatus of the class described, comprising a blower formed of a sectional casing, a motor, a shaft connected to said motor and extending within said casing, valve controlled ports communicating with the interior of said casing, a plurality of blades carried by said shaft, plates connected to said blades and forming chambers therebetween, said blades having their planes disposed at right angles to the plane of rotation of said shaft, a plate arranged in said casing for directing the air outwardly from said blades and means for directing the air to the central part of said casing for exhausting the same therefrom.

4. In apparatus of the class described, comprising a casing formed of two sections, standards supporting said sections, a disk disposed between said sections and formed with a central opening, one of said sections formed with a plurality of inlet ports and a central opening, a motor supported by one of said standards, a shaft operable by said motor and projecting through the section and disk openings, a plurality of blades of trapezoidal configuration mounted on said shaft, plates secured to said blades, a plate adjustably secured to one of said sections, valves controlling the said inlet ports, means for directing the air downwardly from said ports to the blower blades, an outlet port, and means for directing the air from the blades to said outlet port.

5. In apparatus of the class described, comprising a casing formed of two sections, standards supporting said sections, a disk disposed between said sections and formed with a central opening, one of said sections formed with a plurality of inlet ports and a central opening, a motor supported by one of said standards, a shaft operable by said motor and projecting through the section and disk openings, a plurality of blades of trapezoidal configuration mounted on said shaft, plates arranged on said blades, a plate adjustably secured to one of said sections, valves controlling the said inlet ports, means for directing the air downwardly from said ports to the blower blades, an outlet port, means for directing the air from the blades to said outlet port, and means for adjusting said plate with respect to the said blades.

6. In apparatus of the class described, comprising a casing formed of two sections, standards supporting said sections, a disk disposed between said sections and formed with a central opening, one of said sections formed with a plurality of inlet ports and a central opening, a motor supported by one of said standards, a shaft operable by said motor and projecting through the section and disk openings, a plurality of blades of trapezoidal configuration mounted on said shaft, plates connected to said blades and forming chambers therebetween, a plate adjustably secured to one of said sections, valves controlling the said inlet ports, means for directing the air downwardly from said ports to the blower blades, an outlet port, means for directing the air from the blades to said outlet port, and means for mounting said blades on said shaft.

In witness whereof I have hereunto set my hand.

ANTOINE LAMONTAGNE.